United States Patent
Bolanowski

(10) Patent No.: US 8,429,374 B2
(45) Date of Patent: Apr. 23, 2013

(54) SYSTEM AND METHOD FOR READ-WHILE-WRITE WITH NAND MEMORY DEVICE

(75) Inventor: Wladyslaw Bolanowski, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 625 days.

(21) Appl. No.: 12/728,472

(22) Filed: Mar. 22, 2010

(65) Prior Publication Data

US 2011/0185114 A1    Jul. 28, 2011

Related U.S. Application Data

(60) Provisional application No. 61/299,065, filed on Jan. 28, 2010.

(51) Int. Cl.
  *G06F 12/00* (2006.01)
  *G06F 13/00* (2006.01)
  *G06F 13/28* (2006.01)
  *G11C 11/34* (2006.01)
  *G11C 16/04* (2006.01)

(52) U.S. Cl.
  USPC ........... 711/173; 711/103; 711/147; 711/148; 711/150; 711/151; 711/152; 711/153; 711/165; 365/185.01; 365/185.33

(58) Field of Classification Search .......... None
  See application file for complete search history.

(56) References Cited

U.S. PATENT DOCUMENTS

| 5,593,410 | A | 1/1997 | Vrespa |
| 2007/0239926 | A1* | 10/2007 | Gyl et al. ............ 711/103 |
| 2009/0136898 | A1 | 5/2009 | Kim |
| 2009/0210616 | A1 | 8/2009 | Karamcheti et al. |
| 2009/0216960 | A1* | 8/2009 | Allison et al. ............ 711/149 |
| 2009/0319734 | A1 | 12/2009 | Aihara |

FOREIGN PATENT DOCUMENTS

DE    2744564    4/1979

OTHER PUBLICATIONS

International Search Report and Written Opinion from corresponding International Application No. PCT/IB10/003120.

* cited by examiner

*Primary Examiner* — Yaima Campos
*Assistant Examiner* — Marwan Ayash
(74) *Attorney, Agent, or Firm* — Renner, Otto, Boisselle & Sklar, LLP

(57) ABSTRACT

System, method, and program to perform simultaneous read and write operations in a NAND-type memory device, including: assigning a first partition in a NAND-type memory device, wherein the first partition is configured to perform read operations on high priority read content; assigning a second partition in the NAND-type memory device, wherein the second partition is configured to perform read operations and write operations, wherein the read operations are performed on non-high priority read content; and controlling the first partition and second partition to operate in a simultaneous manner.

10 Claims, 4 Drawing Sheets

SYSTEM AND METHOD FOR READ-WHILE-WRITE WITH NAND MEMORY DEVICE

RELATED APPLICATION DATA

This application claims the benefit of U.S. Provisional Application No. 61/299,065, filed on Jan. 28, 2010, which is incorporated herein by reference.

TECHNICAL FIELD OF THE INVENTION

The technology of the present disclosure relates generally to non-volatile memory devices, particularly flash memory devices with NAND-type architecture and more particularly to a system and method for performing simultaneous read operations and write operations in a NAND-type memory device.

BACKGROUND

A flash memory device, such as those used in electronic devices (e.g., a desktop computer, a handheld computer, a mobile telephone, a digital camera or any other kind of computer/microcontroller based terminal that can use non-volatile memory as a storage medium) may have multiple partitions. During write operations, data cannot be read from the memory until the write operation is completed. This causes read latency that might not be desirable or acceptable for time critical use cases, like demand paging, for example. In any application, overall system performance will be faster if data can be read from read-only partitions while write operations are in process.

One example of an application where read latency is critical is the paging-on-demand-technique, where pages of data are not copied from data storage to RAM until they are needed. Memory is organized in so-called blocks and pages, with one page typically consisting of 1 kB or 4 kB in the demand paging context. A block combines several pages and usually has a size of 16 kB. To reduce the required memory size, only pages that are currently needed for an application are loaded. Therefore, demand paging requires simultaneous read and write processes. In NAND flash memory systems, paging-on-demand may be applied, but a major drawback of systems for this technique is that read and write operations cannot be performed simultaneously.

One proposal by the JEDEC Solid State Technology Association to handle the situation when there is an ongoing write operation and another write operation is requested with an embedded memory (eMMC) is to wait until the write operation has been concluded before permitting a read operation to be requested. Another proposal is to allow interrupting an ongoing write operation and thereby shorten the latency for the high priority read. There are a variety of problems with these approaches. For example, consider a write operation that has been requested to write the (10) blocks into the eMMC. After writing down four (4) blocks, the operation or process is interrupted by a high priority read operation or process. When the high priority read operation has been concluded, the file system resumes the write operation in order to write down the remaining six (6) blocks, but then a new high priority read request may arrive, and the write operation is interrupted again. One of the sources of high priority read is demand paging, which is a code execution method. During startup of the electronic device or when launching a new application, there can be a whole series of page faults that will request high priority read operations. In the foregoing scenario, there may be several seconds delay before the write command can be concluded.

Any of the described features and problems are present in both memory cards and embedded mass storage devices based on flash memory. Therefore, a need exists to provide a method of controlling read processes on NAND flash memory cards and embedded mass storage devices in order to decrease read latency times.

SUMMARY

According to an aspect of the invention, a method, device and computer program is disclosed that supports a simultaneous read and write operation interface in a NAND memory device by defining a partition that is configured only to be used for reading content (e.g., high priority read content). In general, one or more partitions are assigned for high priority read content (e.g., reading programming code, etc.). One or more of the remaining partitions are then intended to support both writing and non-prioritized reading. The controller portion of the memory device splits one common queue into at least two queues, with the first queue configured for reading from the read only partition and the second queue for reading and writing partition(s). The two queues are executed in parallel. When a write operation has been requested into the read only partition, a temporary write will be made, which is maintained by the memory controller, into a partition that has read and write capabilities. Then during system idle time, the temporary written content will be transferred, as a background operation, into the read only partition.

One aspect of the invention relates to a method for simultaneous read and write operations to be performed in a NAND-type memory device, the method includes: assigning a first partition in a NAND-type memory device, wherein the first partition is configured to perform read operations on high priority read content; assigning a second partition in the NAND-type memory device, wherein the second partition is configured to perform read operations and write operations, wherein the read operations are performed on non-high priority read content; and controlling the first partition and second partition to operate in a simultaneous manner.

Another aspect of the invention relates to the step of controlling includes forming a first queue and a second queue from a primary queue, wherein the first queue executes read operations associated with the first partition and the second queue executes read and write operations associated with the second partition.

Another aspect of the invention relates to the first queue and the second queue being executed in parallel.

Another aspect of the invention relates to when additional content is required to be written to the first partition, a temporary write is made to the second partition to store the additional content.

Another aspect of the invention relates to when an associated host device requests writing additional content to the first partition, a temporary write is made to the second partition to store the additional content.

Another aspect of the invention relates to transferring the additional content to the first partition during an idle time associated with a system in which the NAND-type memory device is coupled.

Another aspect of the invention relates to assigning one or more additional partitions, wherein at least one of the additional partitions is configured to perform read operations and write operations.

Another aspect of the invention relates to when the read and/or write operations performed by the one or more additional partitions are performed on non-high priority read content.

Another aspect of the invention relates to controlling the first partition, the second partition and the one or more additional partitions in parallel.

Another aspect of the invention relates to the step of controlling including forming a first queue and a second queue and additional queues for each of the additional partitions from a primary queue, wherein the first queue executes read operations associated with the first partition and the second queue executes read operations and write operations associated with the second partition and each of the additional queues execute read operations and write operations associated with each of the one or more additional partitions.

Another aspect of the invention relates to a non-volatile memory device including: a NAND-type memory chip including a first partition configured to perform read operations on high priority read content and a second partition configured to perform read operations and write operations, wherein the read operations are performed on non-high priority read content; and a memory controller configured to control the first partition and second partition to operate in a simultaneous manner, such that the first partition may read high priority content when the second partition is reading or writing content.

Another aspect of the invention relates to the memory controller including a first queue for executing read operations associated with the first partition and a second queue for executing read and write operations associated with the second partition Another aspect of the invention relates to the first queue and the second queue being configured to be executed in parallel.

Another aspect of the invention relates to when additional content is required to be written to the first partition, the memory controller is configured to permit a temporary write to be made to the second partition to store the additional content.

Another aspect of the invention relates to when an associated host device requests writing additional content to the first partition, a temporary write is made to the second partition to store the additional content.

Another aspect of the invention relates to the memory controller transferring the additional content to the first partition during an idle time associated with a host device in which the NAND-type memory device is coupled.

Another aspect of the invention relates to including one or more additional partitions in the NAND-type memory device, wherein at least one of the additional partitions is configured to perform read operations and write operations.

Another aspect of the invention relates to the memory controller being configured for controlling the first partition, the second partition and the one or more additional partitions in parallel.

Another aspect of the invention relates to the memory controller including a first queue for controlling execution of the first partition, a second queue for controlling execution of the second partition and additional queues for each additional partition contained on the NAND-type memory chip.

Another aspect of the invention relates to a program for use in an electronic host device for controlling for simultaneous read and write operations to be performed in a NAND-type memory device, wherein the NAND-type memory includes a first partition and a second partition; and a memory controller configured to control the first partition and the second partition to execute in a simultaneous manner, wherein the first partition is a read only partition dedicated to high priority read content and second partition is a read and write partition, the program including executable logic to: place high priority read content on the first partition; receiving a request for writing additional content on the first partition; writing the additional content to the second partition; and transferring the additional content to the first partition when a signal is received from the host electronic device to the memory control indicating that the host electronic device is in an idle state.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments. It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

In the present application, embodiments of the invention are described in the context of an electronic device. It will be appreciated that the invention is intended to be interpreted broadly to include to any type of appropriate electronic device, examples of which include a media player, a gaming device, a PDA, a computer, digital cameras, mobile telephones, laptops, tablets, other mobile devices capable of showing images or running computer applications, etc.

DETAILED DESCRIPTION OF EMBODIMENTS

Figure 1:
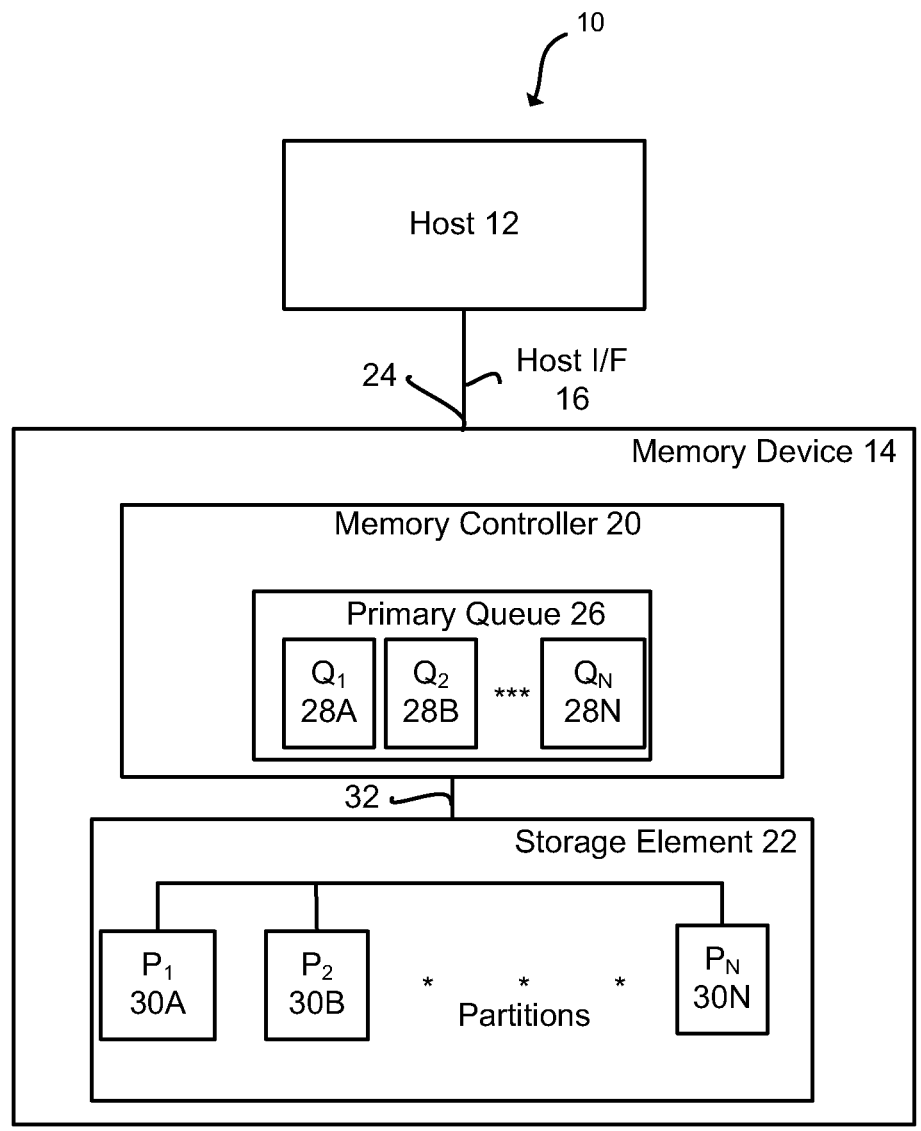
FIG. 1 is an exemplary embodiment of a system in accordance with aspects of the present invention.

Embodiments will now be described with reference to the drawings, wherein like reference numerals are used to refer to like elements throughout. It will be understood that the figures are not necessarily to scale.

The invention will be described in connection with a generic host device. It will be appreciated that aspects of the disclosed method may be applied to electronic devices such as, but not limited to, desktop computers, handheld computers, tablet computers, mobile telephones, digital cameras, personal digital assistants, music players, and any other kind of computer/microcontroller based device that can use non-volatile memory as a storage medium.

The present invention is described below with respect to a host device that includes a NAND-type memory device for simultaneous performance of read and write operations. In general terms, the NAND-type memory device assigns a first partition that is configured to be used exclusively for reading high priority content (e.g., program code, etc). One or more partitions may be assigned for high priority read content. The remaining partition or partitions are then intended to support both write operation and non-prioritized read operations. The controller portion of the memory device will split one common queue into two queues, with the first queue for reading from the read only partition and the second queue for controlling the other partitions (e.g., partitions configured to perform read operations and write operations). The two queues are executed in parallel. When a request is made to write to the first partition (e.g., read only partition) then a temporary write operation will be made, which places the content into a second partition (e.g., a partition that allows read operations and write operations). Then during system idle time, the temporary written content will be transferred, as a background operation, into the read only partition.

Referring initially to FIG. 1, a system 10 in the form of a host 12 and a memory device 14 is illustrated. The host 12 and the memory device 14 may communicate through an interface 16. The external host device 12 may be represented by a terminal comprising a processor for executing program code stored in a storage medium. The host 12 may need information stored on the memory device 14 to execute program code or to display the information on the host 12, such as an internal flash memory or a flash memory card in an electronic device. The host 12 may be capable of controlling this memory access and to communicate data with the memory device 14. For this purpose, the host 12 is connected to the memory controller of the memory device 14. Such communications between the host 12 and the memory device occur over the interface 16. As stated above, the host 12 may for example be a desktop computer, a handheld computer, a mobile telephone, a digital camera or any other kind of computer/microcontroller based terminal that can use non-volatile memory as a storage medium.

The memory device 14 is a non-volatile memory device and may be provided, e.g., as a removable memory element (memory card) or as embedded mass storage arranged within the device. The non-volatile memory device 14 comprises at least one NAND type flash memory chip that includes a memory controller 20 and a storage element 22. The memory device 14 includes a port 24 for facilitating communication between with host device 12 and the memory device 14 through the interface 16.

The memory control 20 includes a primary queue 26. A queue is a particular kind of collection in which the entities in the collection (e.g., read/write operations to be performed by the memory device 14) are kept in order and the principal operations on the collection are the addition of entities to the end position and removal of entities from the front terminal position.

The primary queue 26 may have a plurality of queues (e.g., queues 28A, 28B, . . . , 28N) formed within the primary queue 18. For example, as shown in FIG. 1, the queues 28A, 28B, . . . , 28N may be formed in the primary queue 26, where N may be dependent on the number of partitions (30A, 30B, . . . , 30C) formed in the storage element 22, for example. Each of the queues (28A, 28B, . . . , 28N) may be assigned to operate on a certain partition of the in the storage element 22. One of ordinary skill in the art will readily appreciate that the number of queues may be independent of the number partitions of storage element 22. For example, there may be fewer queues formed in the primary queue 26 than there are partitions in the storage element 22. The queues 28A, 28B, . . . , 28N are designed to operate in parallel. That is, the queues 28A, 28B, . . . , 28N may simultaneously perform a task stored in each respective queue.

One of the queues (e.g., 28A) may be dedicated to performing high priority read operations in a partition (e.g., 30A) that is dedicated to performing high priority read operations, for example. There may be more queues (e.g., 28B) that are also assigned to perform high priority read operations.

The storage element 22 includes a plurality of partitions (e.g., partitions 30A, 30B, . . . , 30N). At least one partition (e.g., partition 30A) is assigned in the memory device 14 and configured to perform read operations on high priority read content. There may be additional partitions that may be also assigned to perform read operations on high priority content. For purposes of this disclosure, we will assume that partition 30A has been assigned and configured to only perform read operations on high priority read content.

High priority read content may be determined in a variety of manners. For example, a file containing an application may be assigned to operate on a particular partition. When access to a file has been requested, the memory controller 20 automatically assigns the application to the high priority read partition and/or corresponding queue. Alternatively or in addition, a file may have a flag that indicates that the file is a high priority read content, for example.

The storage element 22 also includes at least one partition (e.g., partition 30B) that is assigned and configured to perform read and write operations on non-high priority read content.

The host 12 may communicate with the memory controller 20 via a host interface 16, such that control of the read and write operations may optionally be performed by the host 12. Data to be written onto the memory device 14 or to be read from the memory device 14 is also transferred via the host interface. The memory controller 20 includes one or more read/write ports 32 of the memory controller 14 that may be used for accessing the partitions (e.g., $P_1, P_2, \ldots, P_N$). For example, there may be one port 32 or there may be multiple ports for controlling whether certain partitions perform read and/or write operations on the memory chip 14 according to predefined specifications. As stated above, the storage element 22 includes partitions (e.g., $P_1, P_2, \ldots, P_N$), where at least one of the partitions (e.g., $P_1$) is dedicated to performing read operations on high priority read content (e.g., program code). One or more of the other partitions (e.g., $P_2, \ldots, P_N$) may perform read/write operations.

The memory controller 20 is configured allow read access to one partition (e.g., $P_1$) while reading or writing to a second partition (e.g., $P_2$) of the memory device 14. For example, when high priority read content is being read by the first partition ($P_1$) and additional content (e.g., high priority read content) is required to be written to the first partition ($P_1$), a temporary write may be made to a partition that may perform read/write operations (e.g., $P_2, \ldots, P_N$).

The memory controller 20 prevents overlapping of memory access (e.g., prevents more than one request being directed to a single partition). To prevent such overlapping, the memory controller 20 should be aware of ongoing operations anywhere on the memory device 14. When there is an ongoing operation or several requests received by the memory controller 20, the controller will issue commands in such a way that it is ensured that only one command at a time is directed to one partition, for example When simultaneous read/write operations are supported by a NAND chip, the memory card controller may issue commands to different partitions of the memory device 14. The memory controller 20 is configured to simultaneously control operations (e.g., act in parallel) on multiple queues (e.g., 28A, 28B, ..., 28N) and multiple partitions (e.g., $P_1, P_2, \ldots, P_N$). The step of controlling includes forming a first queue and a second queue from a primary queue, wherein the first queue executes read operations associated with the first partition and the second queue executes read and write operations associated with the second partition. For example, the first queue (e.g., $Q_1$) may control read operations associated with the partition dedicated to performing high-priority read content (e.g., $P_1$) and the second queue (e.g., $Q_2$) may control read and write operations associated with other partitions.

Figure 2:
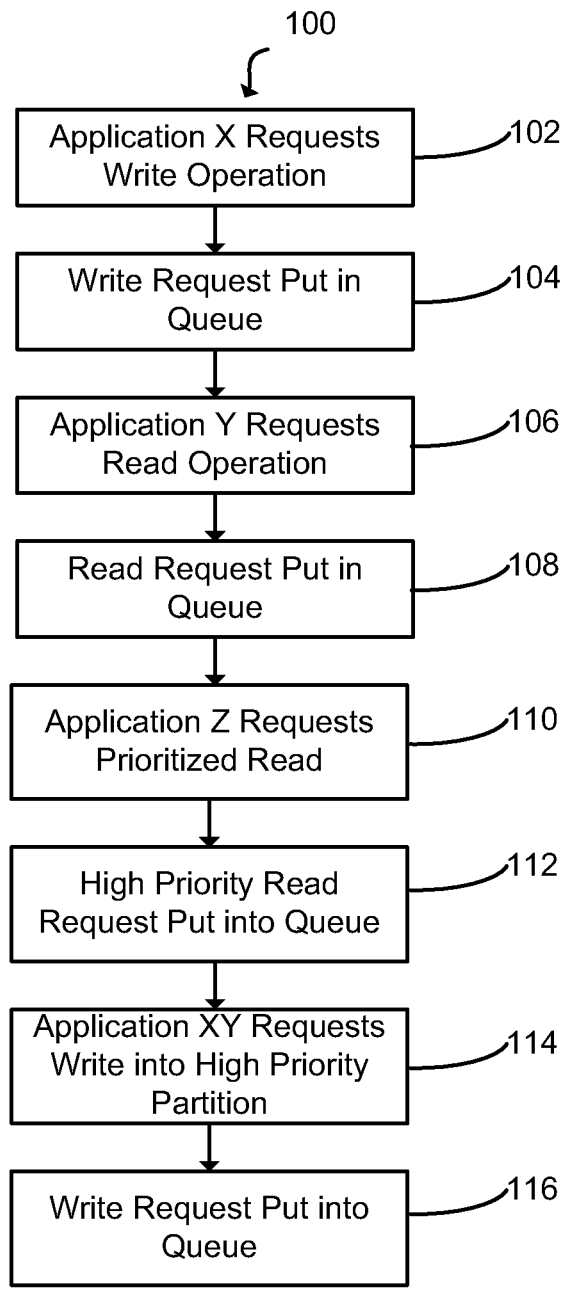
FIG. 2 is a flow chart or logic diagram of an exemplary method carrying out the method of the invention and of exemplary functions of the apparatus and program in accordance with aspects of the present invention.

Turning to FIG. 2, a method 100 for carrying out the invention from the host perspective 12 will be discussed below with reference to the logic diagram or flow chart shown therein. The several blocks illustrated in FIG. 2 will be referred to as blocks, steps or functions, which depending on context mean the same.

At block 102, an application (e.g., Application X) on the host device 12 requests a write operation for non-high priority content. At block 104, the write request is placed into a queue administered by the memory controller 20.

At block 106, another application (e.g., Application Y) on the host device 12 requests a read operation for non-high priority read content. At block 108, the read request is placed into the queue administered by the memory controller 20.

At block 110, another application (e.g., Application Z) on the host device 12 requests reading from a file on the read only partition. At block 112, the high priority read request is placed in the queue administered by the memory controller 20.

At block 114, another application (e.g., Application XY) requests writing of content into the read only partition. At block 116, the write request is placed in the queue administered by the memory controller 20.

Figure 3:
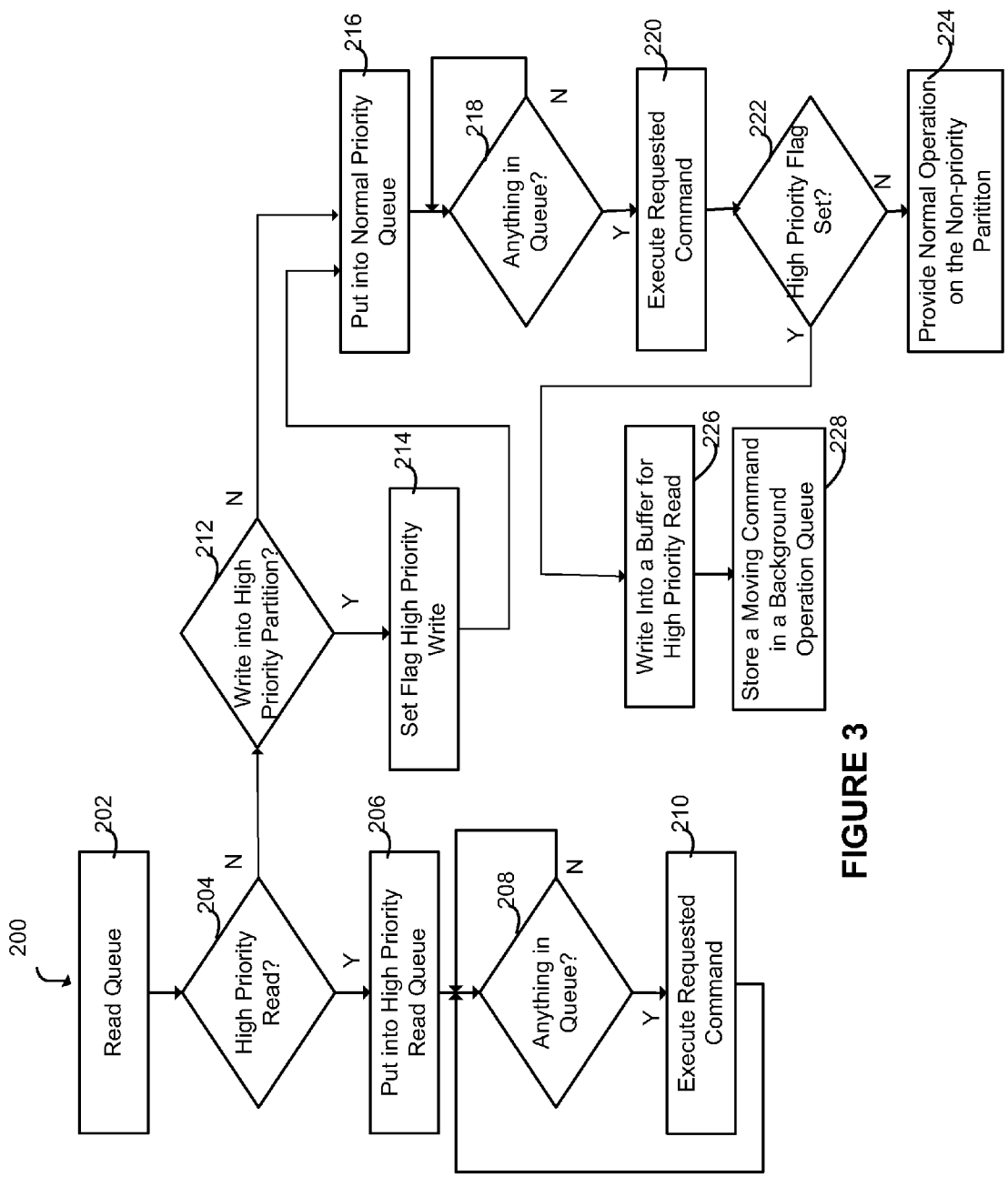
FIG. 3 is a flow chart or logic diagram of an exemplary method carrying out the method of the invention and of exemplary functions of the apparatus and program in accordance with aspects of the present invention.

Referring to FIG. 3, the logic diagram of a computer program flow chart 200 from the memory controller perspective is illustrated as an example of a method for carrying out the invention and the operational interaction and characterization of the parts and functions of the invention. The several blocks illustrated in FIG. 3 will be referred to as blocks, steps or functions, which depending on context mean the same.

At block 202, the memory device 12 reads a queue from the memory device 14. At block 204, a determination is made if a high priority read is requested or a non-high priority read is requested. As one of ordinary skill will appreciate there are a variety of ways to determine whether a file requests a high priority read. For example, an application file may be configured to be placed on a particular partition (e.g., a partition dedicated to high-priority read content); the application may also include a flag or other identifier in the file or attached to the file to signify that the application file contains high-priority read content).

If the queue contains high-priority read content, program flow moves to block 206. At block 206, the high-priority read content is placed in the queue for reading high priority content (e.g., $Q_1$). At block 208, a determination is made if there is additional high-priority content in the queue (e.g., $Q_1$) to read. If there is no additional high-priority content to read, program flow loops back to block 208 until the queue contains high-priority content. If there is additional high-priority content to read, program flow moves to block 210, where a high priority read operation is executed. Program flow then continues to block 208 to determine if there is high-priority content remaining in the queue to be read.

If the determination made in block 204 is that the queue does not contain high priority read content, program flow moves to block 212. At block 212, a determination is made if the queue contains a command to write into the high priority partition (e.g. $P_1$). If the determination at block 212 is "yes" (e.g., the queue contains a command to write into the high priority partition), program flow moves to block 214. At block 214, a priority write flag is set. The priority write flag indicates there is additional content to write into the first partition.

From block 214 and a negative response determined at block 212, program flow moves to block 216. At block 216, the additional content is placed in the queue for the second partition. At block 218, a determination is made if there is anything (e.g., a command) in the queue to read. If there is nothing in the queue, program flow loops back to block 218 until there is a new command in the queue. If there is a new command to read in the queue, program flow moves to block 220, where execution of the requested command is performed. Program flow then continues to block 222.

At block 222, a determination is made if the high priority flag has been set for the current command. If the determination is negative, program flow moves to block 224. At block 224, normal operation of the non-priority partition is provided. If the determination from block 222 is affirmative, program flow moves to block 226. At block 226, the content is written into a buffer for high priority read. Program flow moves to block 228. At block 228, a "MOVE" (or similar) command is stored in a background operation queue in the memory controller. The background operation queue is a queue in the memory controller that is dedicated to background operations.

Figure 4:
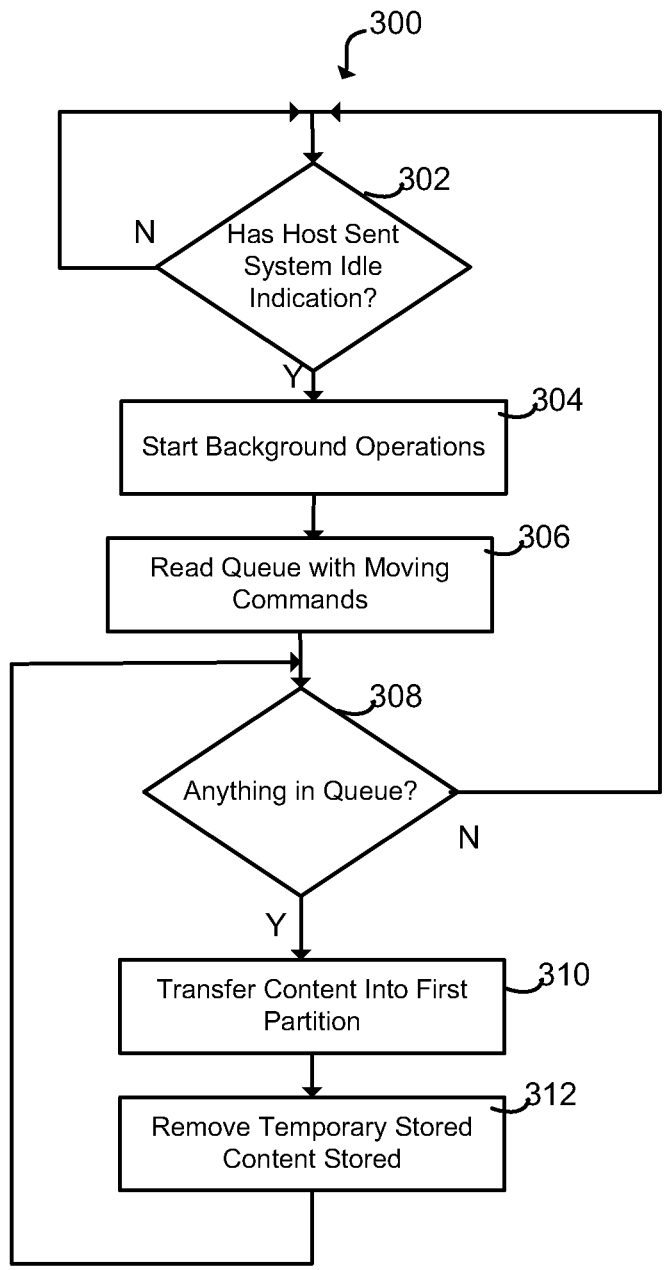
FIG. 4 is a flow chart or logic diagram of an exemplary method carrying out the method of the invention and of exem-

FIG. 4 is another exemplary method 300 in accordance with aspects of the present invention. Method 300 generally operates in parallel to the exemplary method 200 discussed above. At block 302, a determination is made as to whether the host device 12 has sent a system idle indication to the memory device 14. If the determination at block 302 is "no", program flow continues back to block 302 and waits until a system idle indication is received from the host. If the host device 12 has sent a system idle indication to the memory device 14, the determination at block 302 is "yes", which means that the host is idle. Program flow then moves to block 304. At block 304, background operations are initiated. At block 306, the queue containing the moving commands associated with the additional high priority read content stored in a read and write partition is read. At block 308, a determination is made if the queue contains any information. If the queue is empty, program flow moves to back block 302 to continue monitoring whether the host device 12 is idle, as discussed above. If the queue is non-empty, the additional content, which was stored temporarily in a read and write partition (e.g., second partition) is transferred into the first partition, as indicated in block 310. At block 312, the additional content is removed from the partition in which it was temporarily stored. Program flow proceeds to block 308 and progresses as discussed above.

It will be apparent to a person having ordinary skill in the art of computer programming, and specifically in application programming for electronic devices using NAND-type memory devices, how to program the host device 12 to operate and carry out usual logical functions associated with the electronic device and the functions and operation described above with respect to the logic diagrams. Accordingly, details as to specific programming code have been left out for the sake of brevity. Also, while the functions and may be executed by respective processing devices in accordance with an embodiment, such functionality could also be carried out via dedicated hardware or firmware, or some combination of hardware, firmware and/or software.

Although certain embodiments have been shown and described, it is understood that equivalents and modifications falling within the scope of the appended claims will occur to others who are skilled in the art upon the reading and understanding of this specification.

What is claimed is:

1. A method for simultaneous read and write operations to be performed in a NAND-type memory device, the method comprising:
    assigning a first partition in a NAND-type memory device, wherein the first partition is configured to perform read operations on high priority read content;
    assigning a second partition in the NAND-type memory device, wherein the second partition is configured to perform read operations and write operations, wherein the read operations are performed on non-high priority read content; and
    controlling the first partition and second partition to operate in a simultaneous manner,
    wherein the step of controlling includes forming a first queue and a second queue from a primary queue,
    wherein the first queue executes read operations associated with the first partition and the second queue executes read and write operations associated with the second partition and the first queue and the second queue are executed in parallel,
    wherein when additional content is required to be written to the first partition, a temporary write is made to the second partition to store the additional content and the additional content is transferred to the first partition during an idle time associated with a system in which the NAND-type memory device is coupled.

2. The method of claim 1, wherein when an associated host device requests writing additional content to the first partition, a temporary write is made to the second partition to store the additional content.

3. The method of claim 1 further including assigning one or more additional partitions, wherein at least one of the additional partitions is configured to perform read operations and write operations.

4. The method of claim 3, wherein the read and/or write operations performed by the one or more additional partitions are performed on non-high priority read content.

5. The method of claim 3 further including controlling the first partition, the second partition and the one or more additional partitions in parallel.

6. The method of claim 5, wherein the step of controlling includes forming a first queue and a second queue and additional queues for each of the additional partitions from a primary queue, wherein the first queue executes read operations associated with the first partition and the second queue executes read operations and write operations associated with the second partition and each of the additional queues execute read operations and write operations associated with each of the one or more additional partitions.

7. A non-volatile memory device comprising:
    a NAND-type memory chip including a first partition configured to perform read operations on high priority read content and a second partition configured to perform read operations and write operations, wherein the read operations are performed on non-high priority read content; and
    a memory controller configured to control the first partition and second partition to operate in a simultaneous manner, such that the first partition may read high priority content when the second partition is reading or writing content,
    wherein the memory controller includes a first queue for executing read operations associated with the first partition and a second queue for executing read and write operations associated with the second partition and the first queue and the second queue are configure to be executed in parallel,
    wherein when additional content is required to be written to the first partition, the memory controller is configured to permit a temporary write to be made to the second partition to store the additional content, and
    when an associated host device requests writing additional content to the first partition, the temporary write is made to the second partition to store the additional content and the memory controller transfers the additional content to the first partition during an idle time associated with the associated host device in which the NAND-type memory device is coupled.

8. The non-volatile memory device of claim 7 further including one or more additional partitions in the NAND-type memory device, wherein at least one of the additional partitions is configured to perform read operations and write operations.

9. The non-volatile memory device of claim 8, wherein the memory controller is configured for controlling the first partition, the second partition and the one or more additional partitions in parallel.

10. The non-volatile memory device of claim 9, wherein the memory controller includes a first queue for controlling execution of the first partition, a second queue for controlling execution of the second partition and additional queues for each additional partition contained on the NAND-type memory chip.

* * * * *